(12) United States Patent
Nandy et al.

(10) Patent No.: US 7,895,648 B1
(45) Date of Patent: Feb. 22, 2011

(54) RELIABLY CONTINUING A SECURE CONNECTION WHEN THE ADDRESS OF A MACHINE AT ONE END OF THE CONNECTION CHANGES

(75) Inventors: Kousik Nandy, Bangalore (IN); Manikchand Roopchand Bafna, Bangalore (IN); Pratima Pramod Sethi, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 1703 days.

(21) Appl. No.: 10/708,402

(22) Filed: Mar. 1, 2004

(51) Int. Cl.
*G06F 15/16* (2006.01)
*H04L 29/06* (2006.01)

(52) U.S. Cl. .................... 726/14; 726/1; 726/2; 726/3; 726/4; 726/11; 726/12; 726/13; 726/15; 713/153; 713/154; 713/160; 713/162; 713/171; 709/217; 709/219; 709/222; 709/223; 709/228; 380/277

(58) Field of Classification Search .................... 726/14; 709/217; 713/153–154
See application file for complete search history.

(56) References Cited

U.S. PATENT DOCUMENTS

| 5,968,176 A * | 10/1999 | Nessett et al. ................... 726/11 |
|---|---|---|
| 6,272,148 B1 * | 8/2001 | Takagi et al. ................. 370/469 |
| 6,490,259 B1 * | 12/2002 | Agrawal et al. .............. 370/331 |
| 6,904,466 B1 * | 6/2005 | Ishiyama et al. ............. 709/245 |
| 7,120,930 B2 * | 10/2006 | Maufer et al. .................. 726/11 |
| 7,197,035 B2 * | 3/2007 | Asano ......................... 370/392 |
| 7,562,384 B1 * | 7/2009 | Huang ............................ 726/5 |
| 2001/0009025 A1 * | 7/2001 | Ahonen ....................... 713/161 |
| 2002/0095603 A1 * | 7/2002 | Godwin et al. .............. 713/201 |
| 2003/0069016 A1 * | 4/2003 | Bahl et al. ................... 455/432 |
| 2003/0123481 A1 * | 7/2003 | Neale et al. .................. 370/466 |
| 2003/0188001 A1 * | 10/2003 | Eisenberg et al. ........... 709/229 |
| 2004/0093524 A1 * | 5/2004 | Sakai .......................... 713/201 |
| 2004/0139170 A1 * | 7/2004 | Shen et al. ................... 709/218 |
| 2004/0210766 A1 * | 10/2004 | Kroselberg .................. 713/201 |
| 2004/0266450 A1 * | 12/2004 | Chowdhury .............. 455/452.2 |
| 2005/0083947 A1 * | 4/2005 | Vaarala et al. .......... 370/395.51 |
| 2005/0144303 A1 * | 6/2005 | Zhang et al. ................. 709/231 |
| 2005/0149732 A1 * | 7/2005 | Freeman et al. ............. 713/171 |
| 2005/0177722 A1 * | 8/2005 | Vaarala et al. ............... 713/168 |
| 2005/0198384 A1 * | 9/2005 | Ansari et al. ................. 709/245 |
| 2006/0185010 A1 * | 8/2006 | Sultan .......................... 726/12 |
| 2008/0098126 A1 * | 4/2008 | Godwin et al. .............. 709/232 |
| 2008/0229095 A1 * | 9/2008 | Kalimuthu et al. .......... 713/153 |

(Continued)

OTHER PUBLICATIONS

Perkins, RFC 3344, Nokia Research Center, Aug. 2002.*

(Continued)

*Primary Examiner*—Edan Orgad
*Assistant Examiner*—Jenise E Jackson
(74) *Attorney, Agent, or Firm*—Patent Capital Group (57) ABSTRACT

An end machine (connected to one end of secure connection) may reliably continue to use the security association (SA) even if the self_address (usually the address of the interface) of the end machine changes. The end machine includes the new IP address in the payload of a packet (e.g., an address update message) sent to another end machine at the other end of the connection. The payload can be encrypted and authenticated to avoid third party attacks. As a result, connectivity can restored for user applications reliably and quickly without requiring substantial computations and/or data exchanges.

75 Claims, 6 Drawing Sheets

U.S. PATENT DOCUMENTS

2009/0059940 A1* 3/2009 Sultan ........................ 370/401

OTHER PUBLICATIONS

Maughan et al, National Security Agency, Internet Security Association and Key Management Protocol, Nov. 21, 1995, pp. 1-59.*

Dupont, et al. ; Entitled,"Request for Comments: 2026—Address Management for IKE version 2"; Jan. 2003; Available from www.ietf.org; (10 Pages).

Dupont, et al. ; Entitled,"Request for Comments: 2026—Address Management for IKE version 2"; Jun. 2003; Available from www.ietf.org; (12 Pages).

Maughan, et al. ; Entitled,"Request for Comments: 2048 -Internet Security Association and Key Management Protocol (ISAKMP)"; Nov. 1998; Available from www.ietf.org; (82 Pages).

Harkins, et al. ; Entitled,"Request for Comments: 2048—The Internet Key Exchange (IKE)"; Nov. 1998; Available from www.ietf.org; (86 Pages).

Kent, et al. ; Entitled, "Request for Comments: 2041 -Security Architecture for the Internet Protocol"; Nov. 1998; Available from www.ietf.org; (66 Pages).

\* cited by examiner

RELIABLY CONTINUING A SECURE CONNECTION WHEN THE ADDRESS OF A MACHINE AT ONE END OF THE CONNECTION CHANGES

BACKGROUND OF INVENTION

1. Field of the Invention

The present invention relates to telecommunication networks, and more specifically to a method and apparatus for reliably continuing a secure connection when the address of a machine at one end of the connection changes.

2. Related Art

Secure connections are often used to attain various features such as confidentiality/privacy (preventing third parties from accessing/viewing the exchanged information), data integrity (the data sent by a sender is not tampered with, by third parties), and authentication (the data is sent by the party purporting to be the sender), as is well known in the relevant arts.

A security association (SA) is generally associated with each secure connection. A SA generally contains several parameters which define the security services offered to a secure connection. SA is described in further detail with reference to examples in RFC 2401, available from www.ietf.org. In the embodiments described below, SA is used to specify the authentication mechanism (e.g. usage of digital certificates from a specific certificate authority or passwords, cryptographic algorithm etc.) and the traffic encryption services (e.g. payload encapsulation or header authentication, etc.).

SA is generally bound to a machine address (e.g., IP address) of another end. Typically, protocols such as Internet Security Association and Key Management Protocol (ISAKMP, described in RFC 2408) provide for creation of an SA for a secure connection, which is then used for secure exchanges on the connection. Each end machine uses an IP address of the other end machine in associating the SA to the specific secure connection.

The address of a machine at one end of the secure connection may change. For example, the IP address of a mobile node (e.g., a laptop machine) may change when the node moves from one sub_net (access network) to the other (in which common addresses would not be usable) as is well known in the relevant arts. It is often desirable that connectivity for user applications (operating on top of the secure connection) be continued seamlessly (with minimal disruption) when the address of a machine at one of the secure connection changes.

In one prior approach, the secure connection and the associated SA are set up afresh when the address of a machine at one end changes. Once the connection and the SA are set up, connectivity is continued for the user applications. In general, applications encounter disruption in connectivity while the secure connection and the SA are being set up.

Such a situation is undesirable generally when the users experience the disruption. The disruption may be experienced at least in situations when connectivity is absent for a few seconds. Such extended absence of connectivity can be encountered in situations where computationally intensive tasks may need to be repeated while negotiating various SA attributes.

For example, a substantial amount of processing resources may be required to generate keys corresponding to a machine at one end of the secure connection, and accordingly the users may experience the disruption. The disruption may be particularly more with devices (such as notebooks, handheld personal digital assistant, etc.) having limited computational resources. In addition, it may be desirable to minimize/avoid the data transfer overhead resulting from the need to negotiate various SA attributes.

At least some of such requirements appear to be addressed by the teachings of a document entitled, "Address Management for IKE version 2", by Francis Dupont, Internet Engineering Task Force, publication date: January 2003 (hereafter "Dupont"). Specifically, in section "2.4 Mobility requirements" of Dupont, it is stated that, "When the mobile node moves, another care_of address is used and some SAs, including the IKE SA, must be updated to use the new address." Section "3.5 Explicit address update" of Dupont further states that "The explicit mechanism MUST be used. A new notification has to be defined. We propose to copy it from the delete notification." Delete notification is defined in RFC 2408 as well as in Annex C of a revised version of the above document with same title published in June 2003. The format specified there does not appear to include a provision for including the new machine (IP) address of the end machine (moving to a new location). It appears that the other end machine would learn the new IP address from the header (source IP address) of the explicit address update packet.

Several problems may be presented by such an approach. For example, an unknown third machine may snoop the explicit address update packet and "replay" with a different source IP address. Replay generally entails using the payload of the explicit address update packet noted above and resending the same payload in another packet. The machine at the other end of the connection may accept the address update and start communicating with the unknown third machine (instead of the machine that has moved with a new IP address). That is, the packets intended for the moving end machine may thereafter be diverted to the unknown third machine, which is undesirable.

Dupont further teaches a 'reverse routability check' to address some of the issues associated with the replay_type possibility. 'Reverse routability check' generally refers to an approach in which the machine at the other end of the secure connection (i.e., the end machine other than the one with the changing IP address) may request the moving end machine to identify itself, and the moving end machine may send a response with an appropriate identifier.

Unfortunately, reverse routability check type of approaches also may not be robust enough in avoiding the diversion of packets to unknown third machines. For example, when the unknown third machine (after sending the address update request) receives a reverse routability check, the contents of the check may be forwarded to the machine which has moved to a new address. The machine with the new address may respond back with an appropriate response for the reverse routability check, which can be forwarded to the machine at the other end of the secure connection. The response may be accepted by the machine at the other end, and packets may thereafter be diverted to the unknown third machine.

What is therefore needed is a method and apparatus to reliably continue a secure connection when the address of a machine at one end of the connection changes.

BRIEF DESCRIPTION OF DRAWINGS

The present invention will be described with reference to the accompanying drawings briefly described below.

In the drawings, like reference numbers generally indicate identical, functionally similar, and/or structurally similar elements. The drawing in which an element first appears is indicated by the leftmost digit(s) in the corresponding reference number.

DETAILED DESCRIPTION

1. Overview

According to an aspect of the present invention, if the IP address of an end machine at one end of a secure connection changes, the new IP address of the end machine is included in the payload (non_header) of an IP packet sent to the other end machine. In one embodiment, the new IP address is included in the ISAKMP portion of the IP packet payload.

As the ISAKMP portion is encrypted and authenticated, undesirable third parties may not be able to decipher or alter the ISAKMP portion. Due to the inability to decipher the packet, 'replay' type options may not be possible. Accordingly, attacks such as those described above in the background section may be avoided.

The new IP address thus sent may be used associated with the same SA (security association) which was used for a secure connection between two end machines prior to the change of IP address. As a result, the computational and/or data transfer requirements may be minimized in continuing connectivity for user applications after the change of address. Thus, connectivity can potentially be continued seamlessly with imperceptible disruption for users.

Several aspects of the invention are described below with reference to examples for illustration. It should be understood that numerous specific details, relationships, and methods are set forth to provide a full understanding of the invention. One skilled in the relevant art, however, will readily recognize that the invention can be practiced without one or more of the specific details, or with other methods, etc. In other instances, well known structures or operations are not shown in detail to avoid obscuring the invention.

2. Example Environment

Figure 1:
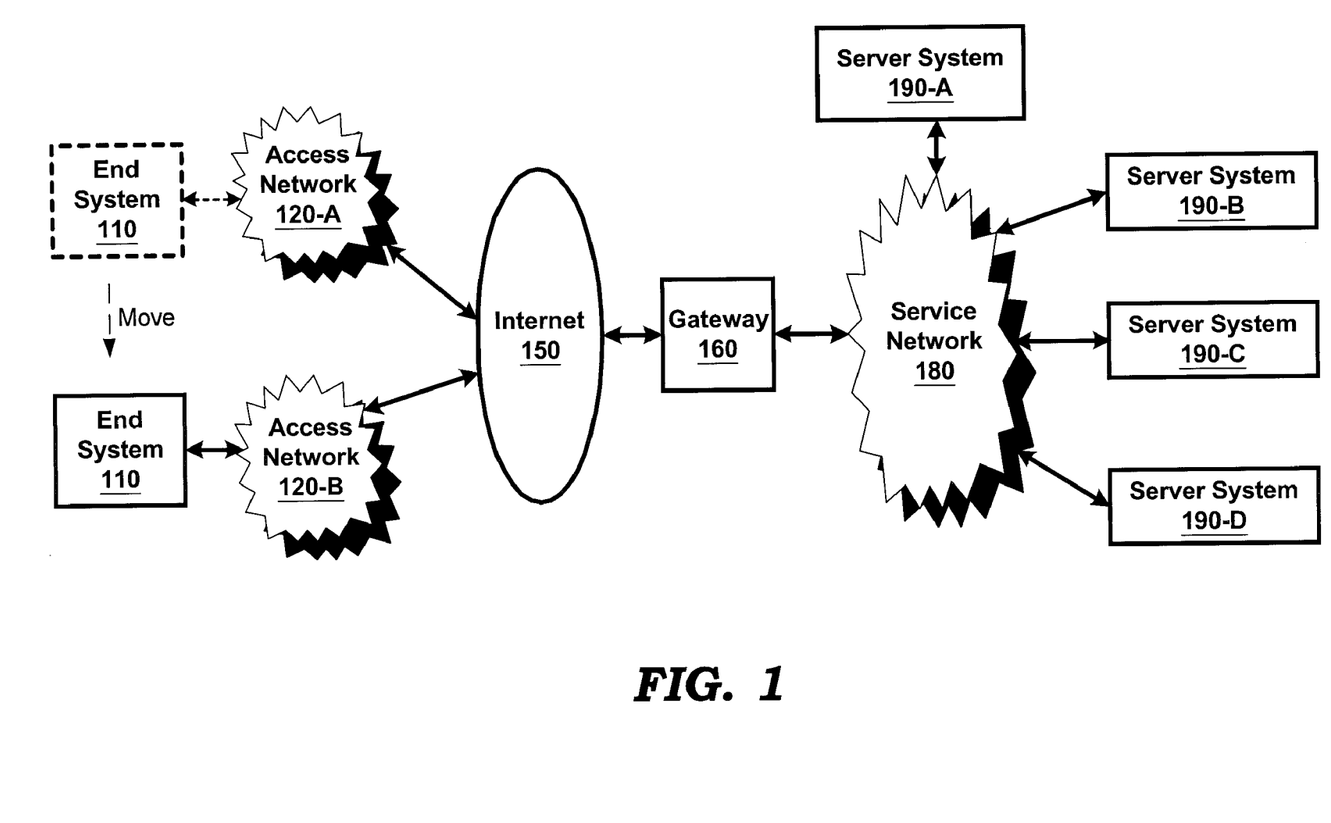
FIG. 1 is a block diagram illustrating an example environment in which the present invention can be implemented.

FIG. 1 is a block diagram of a networking system illustrating an example environment in which the present invention can be implemented. The networking system is shown containing client system 110, access networks 120_A and 120_B, Internet 150, gateway 160, service network 180, and server systems 190_A through 190_D. Each system is described in further detail below.

Client system 110 represents an example end machine (of a secure connection), whose address can change. For illustration, the address is assumed to change as client system 110 is connected from different access networks (e.g., first via access network 120_A and then via access network 120_B). Accordingly, the same client system 110 is shown at two different places in FIG. 1.

However, the address of end machines can change for other reasons as well. For example, when a mobile node moves from one access network to another, the IP address can also change as is well known in the relevant arts. In general, client systems are used to access various services (e.g., provided by server systems 190_A through 190_D) using secure connections managed according to various aspects of the present invention.

Server systems 190_A through 190_D provide various services (e.g., web pages, video conferencing facility, data access, email), and are connected to Internet 150 via service network 180. The services are accessed by various users using end systems as noted above.

Service network 180 provides the connectivity between the server systems and Internet 150. Service network 180 may correspond to a corporate network, and be implemented using protocols such as IP, ATM. In such a scenario, each user may be viewed as an employee accessing the corporate services (resources) over Internet 150.

Access networks 120_A and 120_B enable end systems to be connected to Internet 150 using technologies such as dial_up connections, DSL, etc. In general, each access network forces end systems to use a corresponding group of addresses (either sub_networks or networks), and thus different access networks are associated with different group of addresses. In general, the approaches described herein are applicable when an end machine moves from one sub_net (in which common addresses cannot be used) to the other.

Internet 150 provides connectivity between client systems 110/110_B and server systems 190_A through 190_D. Internet 150 contains several network devices (e.g., routers, switches, gateways, bridges, etc.) which may be implemented to support protocols (e.g., TCP/IP) enabling data connectivity between various machines.

Gateway 160 operates cooperatively with client system 110_A (using protocols such as IPSec described in RFC 2401) to provide a secure connection to end users. In general, the secure connection operates according to various attributes of a security association (SA), which are generally negotiated at the time the secure connection is set up. Gateway 160 and client system 110_A form the two end machines for such a secure connection. Gateway 160 may be contained within service network 180 such that a user is provided a secure connection terminating within the service network.

An aspect of the present invention enables secure connection to be continued in a seamless manner (i.e., without much disruption) reliably even if the address of client system 110_A changes when moving from access network 120_A to access network 120_B. Such a feature is implemented in the context of an environment operating generally according to RFCs 2401 (Security Architecture for the Internet Protocol), 2408 (Internet Security Association and Key Management Protocol (ISAKMP)), and 2409 (The Internet Key Exchange (IKE)).

The details of such an environment according to various aspects of the present invention are described below in further detail.

3. Establishing Security Connection in General

Broadly, in an embodiment, various attributes of a security association are initially negotiated between two end machines before the data is transferred between the end systems and the server systems. For illustration, it is assumed that client system 110 ('initiator') initiates a first message (related to establishing a security connection) and gateway 160 ('responder') responds to the message sent by initiator. A security association is set_up by the end of the exchange phase. The exchange phase is described briefly below.

In one example mode (referred to as "main mode" in RFC 2409), the exchange phase contains a total of six messages grouped into three sub_phases: proposal negotiation, key exchange and authentication phase. Each of the sub_phase contains two messages, one message sent by initiator and another message sent by responder in response to message sent by the initiator. The contents of the messages are briefly described below.

In the proposal sub_phase, the initiator sends a message containing several suites of choices of authentication mechanisms (e.g., pre_shared secret, digital certificates, etc.), the parameters that will be used in the following key exchange messages (e.g., Oakley group numbers of Diffie_Hellman public key exchange), the cryptographic hash that will be used to authenticate the messages (e.g., SHA__1 or MD5), the cryptographic algorithm that will be used to encrypt the exchange messages, lifetime of the secure connection, etc. Message 2 from responder contains one of the choice from the suites proposed in message 1, indicating the accepted authentication and encryption mechanism to be used during further communication.

In key exchange phase, initiator, in message 3, may send the Diffie_Hellman public value (as per the group number agreed on message 1 and 2) corresponding to the initiator. In response, responder sends message 4 which contains its own Diffie_Hellman public value. These public values may be used by both initiator and responder to arrive at a secret session key that is used to encrypt and decrypt the data exchanged between the initiator and responder from next message onwards.

In an authentication phase, both messages 5 and 6 may contain unique identifiers (called 'identity') and a proof of the identity. Such an identifier uniquely identifies the sender, and the proof of the identity can be a digital certificate or a cryptographic hash computed using the pre_shared secret as a parameter (as agreed on messages 1 and 2). Both messages 5 and 6 are encrypted using the secret session key that is derived from the D_H public values exchanged in messages 3 and 4.

Once the main mode exchange is over, the entities derive an ISAKMP SA, which contains information about authenticity of the peer (other end device), and a cryptographic context to communicate further with the peer. In general, setting up a ISAKMP SA entails substantial overhead, and it is desirable to avoid such set up at least for devices with limited processing power. An aspect of the present invention enables the ISAKMP SA to be used even after the self_address of an end device changes.

Multiple secure connections may then be established between the end devices using the ISAKMP SA thus set up. In general, the end devices may need to set up an IPSec SA via a 3 way message handshake known as 'quick mode' (described in RFC 2409 in further detail). The messages in quick mode exchange are described below in further detail.

In quick mode exchange, the initiator sends a message to the responder which contains a set of proposals describing the protocol of security (e.g AH or ESP), encryptionalgorithm (e.g. 3DES, AES), authentication mechanism (e.g. MD5_HMAC or SHA__1_HMAC), and a set of traffic selectors (describing the flow/nature of traffic that is to be covered by the corresponding security protection).

The responder replies with the accepted proposal of the security services and traffic selector. The initiator completes the exchange by sending a third authenticated message, proving its liveliness. After this quick mode exchange is complete, both the initiator and responder derive an SA known as IPSec SA, whose attributes are used to afford security services to the traffic specified in the IPSec SA.

In one embodiment, at least some of the attributes agreed upon in the ISAKMP and IPSec SAs form a corresponding SA at each of the end machines (i.e., client system 110 and gateway 160). Each end machine maintains a security association database (SAD), which binds the SA to the address of the other end machine. The SAD may store data representing several security associations (to corresponding end machines), and each SA_end machine pair may be uniquely identified by security parameter index (SPI). The SPI values in main mode messages are often referred to as cookies.

Once various attributes of a SA are negotiated, the attributes are used to provide a secure connection. The description is continued with reference to a manner in which client system 110 may use same SA to continue to send data, when IP address of client system 110 changes.

4. Method in End Machine Whose Address Changes

Figure 2:
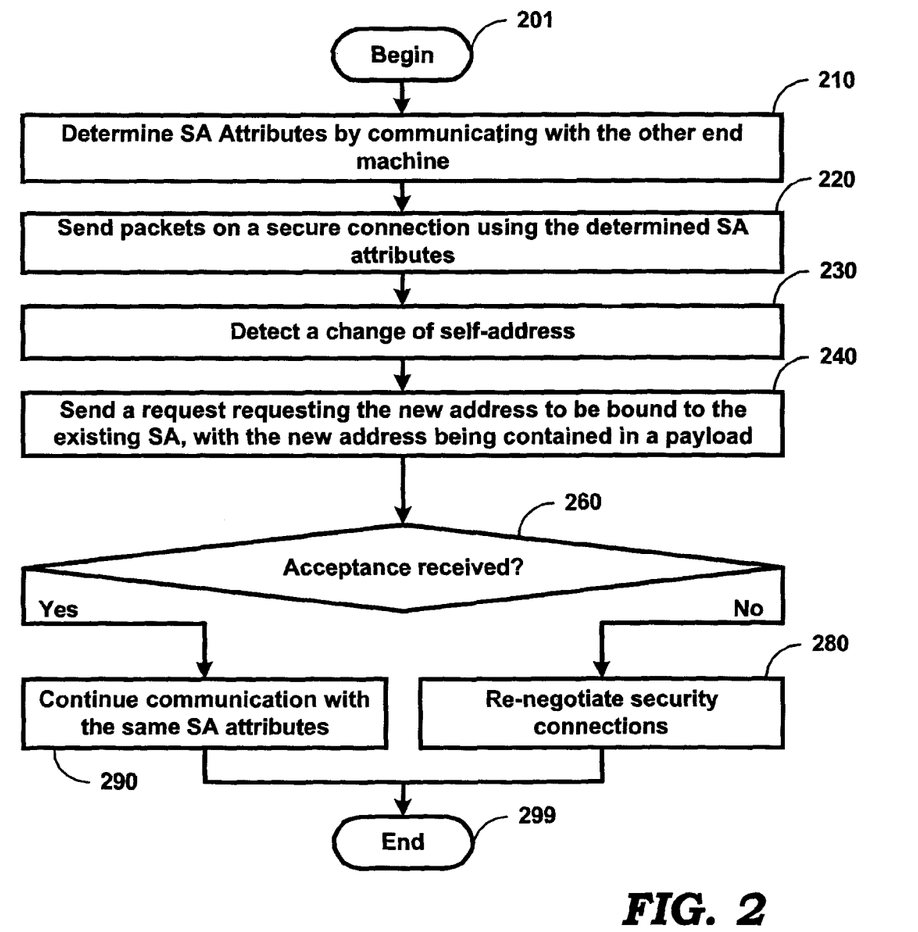
FIG. 2 is a flow chart illustrating the manner in which an end machine may allow connectivity to be continued on a secure connection even if the address of the end machine changes, according to an aspect of the present invention.

FIG. 2 is a flow chart illustrating the manner in which an end machine may allow connectivity to be continued on a secure connection even if the address of the end machine changes, according to an aspect of the present invention. For illustration, the method is described with reference to FIG. 1. However, the method may be implemented in other environments as well, without deviating from the scope and spirit of various aspects of the present invention. The method begins in step 210, in which control is immediately transferred to step 210.

In step 210, client system 110 (operating as one end machine) determines various attributes of a security association (SA) by communicating with the other end machine (i.e., gateway 160 in the present example). A set of messages may be exchanged according to ISAKMP as described above to determine the SA attributes.

In step 220, client system 110 sends packets on a secure connection using the SA attributes determined above. The packets may be sent on the secure connection using the determined SA attributes in a known way.

In step 230, client system 110 detects a change of self_address (from an old address to a new address). In FIG. 1, the change occurs when client system 110 moves from access network 120_A to access network 120_B. A new IP address may be assigned to client system 110 by access network 120_B, and the change in IP address may be detected by client system 110.

In step 240, client system 110 sends a request (address update packet) to gateway 160 requesting the new address to be bound to the SA already present. The new address is contained in a payload portion (e.g., as a part of ISAKMP portion) of an IP packet, as described in a section below. By including the packet in the payload additional security mechanisms such as encryption and authentication can be used to ensure that the new IP address and the payload cannot be used by unknown third parties.

In step 260, client system 110 determines whether an acceptance is received from gateway 160 indicating that the new address is bound to the SA. In an embodiment, it a response is not received within a pre_specified time, an acceptance is deemed to not have been received. An explicit reject message may be received as well within the pre_specified time.

Control is transferred to step 290 if the new address is bound, otherwise to step 280. In step 280, client system 110 re_negotiates SA attributes as a change of address (of client system 110) for the secure connection is not supported by gateway 160. Such re_negotiation may be performed in a known way. Control is then transferred to step 299.

In step 290, client system 110 continues communication with the same security associations set up in step 220. Thus, packets are sent using the new address of client system 110, but with the same SA attributes determined in step 220.

As a result, the overhead of re_negotiating (including any computations required for generating keys and transmission overhead) new SA attributes is avoided. Control is then transferred to step 299, in which the method ends.

The description is continued with reference to a method by which gateway 160 enables the same SA to be used when the address of client system 110 changes according to an aspect of the present invention.

5. Method in Gateway

Figure 3:
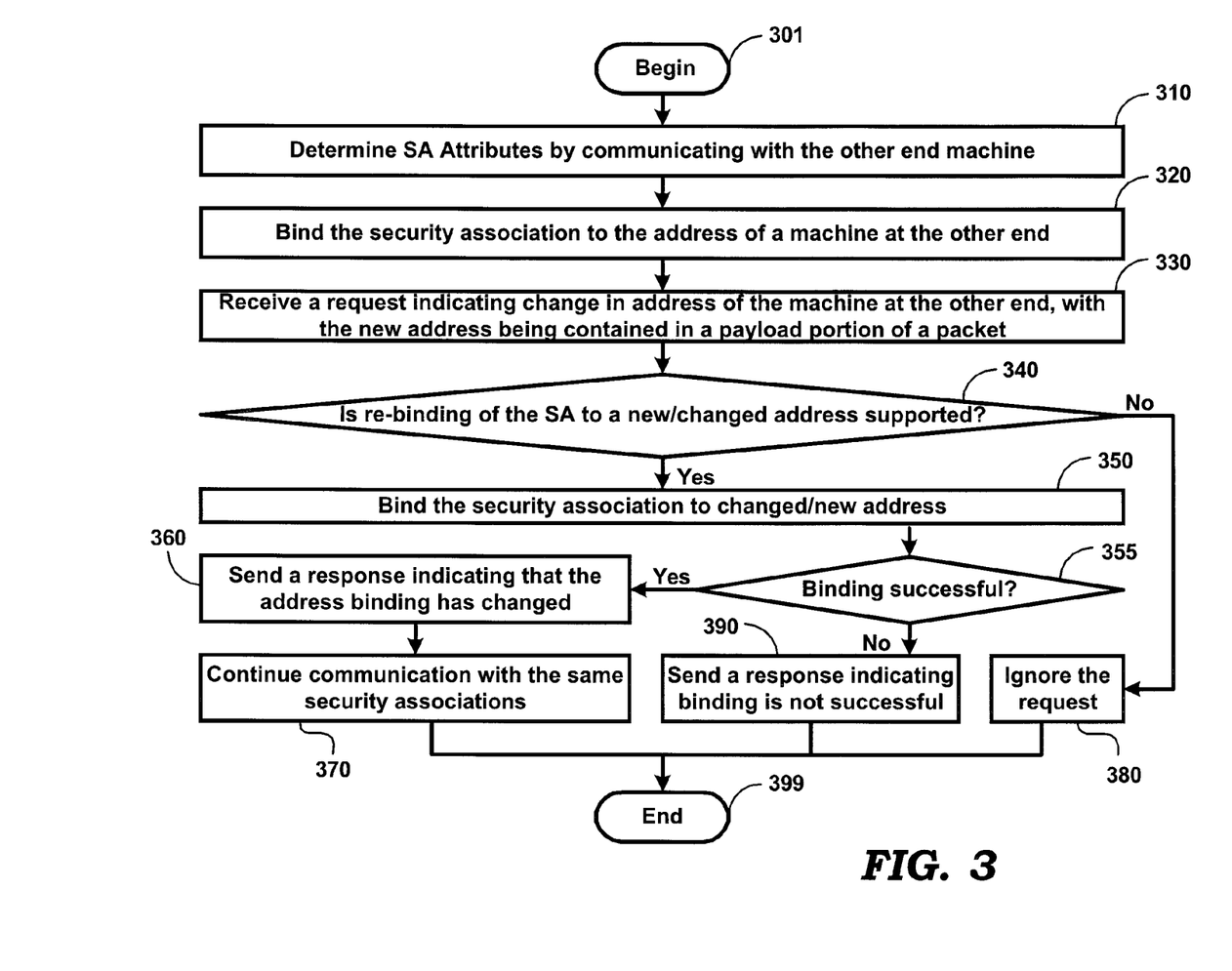
FIG. 3 is a flow chart illustrating the details of a machine connected at an end of a secure connection which enables connectivity to be continued according to an aspect of the present invention when the address of a machine at the other end of the secure connection changes.

FIG. 3 is a flow chart illustrating the manner in which a machine at an end of the secure connection enables the same SA to be used when the address of a machine at the other end of the secure connection changes according to an aspect of the present invention. For illustration, the method is described with reference to FIG. 1. However, the method may be implemented in other environments as well. Such implementations are also contemplated to be within the scope and spirit of various aspects of the present invention. The method begins in step 301, in which control immediately passes to step 310.

In step 310, gateway 160 (operating as one end machine) determines various attributes of a security association (SA) by communicating with the other end machine (i.e., client system 110 in the present example). As noted above, set of messages may be exchanged according to ISAKMP to determine the SA attributes.

In step 320, gateway 160 binds the SA to the address of client system 110 at the other end of the secure connection. In step 330, gateway 160 receives a request indicating a change of address of client system 110 at the other end of the secure connection. In the illustrative example, the changed (or new) address corresponds to an IP address assigned by access network 120_B. The IP address is contained in a payload portion of a packet forming the request.

In step 340, a determination is made as to whether the binding of security association can be changed to the new address. In general, such a determination may be performed based on absence of support for change of binding or based on configuration data supplied by a user. Control is transferred to step 350 if such a change of binding is possible, otherwise to step 380.

In step 350, gateway 160 binds the security association (SA) to changed IP address of client system 110. In an embodiment, the security association database (SAD) is updated to reflect that the existing SA is to be associated with the new/changed IP address.

In step 355, gateway 160 determines whether the binding is successful. Control passes to step 360 if the binding is successful, or else control passes to step 390. In step 390, a reject response (indicating that binding is not performed) may be sent to client system 110. Control then passes to step 399.

In step 360, gateway 160 sends a response indicating that the new address is now bound to the pre_existing SA. In step 370, gateway 160 continues communication with the same security associations (as stored in SAD), but using the new address of client system 110. Thus, the network layer connectivity continues by using the new address, and using the same SA reduces the computational overhead and disruption to connectivity. Control is then trans-ferred to step 399.

In step 380, gateway 160 merely ignores the request received in step 330. In such a case, end_system 110 re_negotiates SA attributes, as the same SA may not be used for data transfer using the new address of client system 110. Control is then transferred to step 399 in which the method ends.

From the above, it may be appreciated that the two end machines need to exchange messages to enable the same SA to be used with the new address of one of the end machines. The description is continued with reference to example packet formats which facilitate such an exchange.

6. Packet Formats

In an embodiment, client system 110 and gateway 160 exchange packets consistent with (or extending) ISAKMP protocol described in further detail in RFC 2408. As noted in RFC 2408, the 'Notification Payload' contains a 'Notify Message Type' (Bytes 11 and 12), and values (8192__16383 and 32768__40959) are reserved for private use.

Three new types of messages (IPADDRESS_UPDATE, IPADDRESS_UPDATE_ACK and IPADDRESS_UPDATE_NACK) are defined using the corresponding three values reserved for private use. An IPADDRESS_UPDATE packet is used by client system 110 to send a request indicating the new address. IPADDRESS_UPDATE_ACK and IPADDRESS_UPDATE_NACK packet types are used by gateway 160 to indicate acceptance and rejection of the request respectively.

If IPADDRESS_UPDATE packet type is not recognised by gateway 160, the packet may simply be ignored as noted in step 380 above. IPADDRESS_UPDATE may be designed with the following format: Bytes 13 to 16: The old/previous IP address; Bytes 17 to 20: The new/changed IP address; Bytes 21 to 24: Unique identifier of the request; Byte 21: Number of SPIs; and Bytes 22 onwards: List of SPIs.

It may be appreciated that a single IPADDRESS_UPDATE packet may contain a list of SPIs, with each SPI uniquely identifying a SA at the other end (i.e., in gateway 160). Thus, when multiple secure connections are present to the same end device (but possibly connecting to different server systems), a single update packet may request the address change with respect to all the corresponding security associations.

IPADDRESS_UPDATE_ACK packet type may repeat the content noted above (bytes 13 onwards) if the new address is bound to all the security associations specified by the list of SPIs. If the request is accepted with respect to only some of the SPIs, only those SPIs may be included in the ACK packet type. Similarly, the IPADDRESS_UPDATE_NACK packet type may repeat the contents noted above if the new address cannot be bound to any of the security associations specified by the list of SPIs.

Thus, the pact formats described above can be used to implement a change of IP address bound to a security association (SA). It should be understood that more elaborate approaches requiring multiple communications before changing an address binding to a SA may be implemented, as will be apparent to one skilled in the relevant arts by reading the disclosure provided herein. Similarly, while negotiating SA attributes, the end machines may exchange packets to determine whether the other end supports binding of an SA to a new address. In such a case, step 380 may be avoided.

From the above, it may be appreciated that the new IP address is contained in the ISAKMP portion of the IP payload. As is well known, encryption and authentication is generally applied on the payloads of the ISAKMP packets. This encryption and authentication mechanisms are generally negotiated during ISAKMP negotiation. For example, Advanced Encryption Standard (AES) cipher can be used to encrypt the payloads and Secure Hash Standard (SHA_1) can be used to authenticate them. By using such encryption and authentication techniques third party attacks can be avoided.

In general, ISAKMP portion contains several sub_portions referred to as ISAKMP payloads, with respective ISAKMP payloads being used to include authentication and encryption related data. Encryption ensures that confidentiality is preserved, and authentication ensures that the source of the packet is reliably communicated to the recipient.

Thus, by including the new address (and other notification information) in the payload of a packet, the present invention prevents unknown third systems from diverting traffic destined to an end system which moves to a new address. The description is now continued with respect to example embodiments of client systems and gateways.

7. Client System

Figure 4:
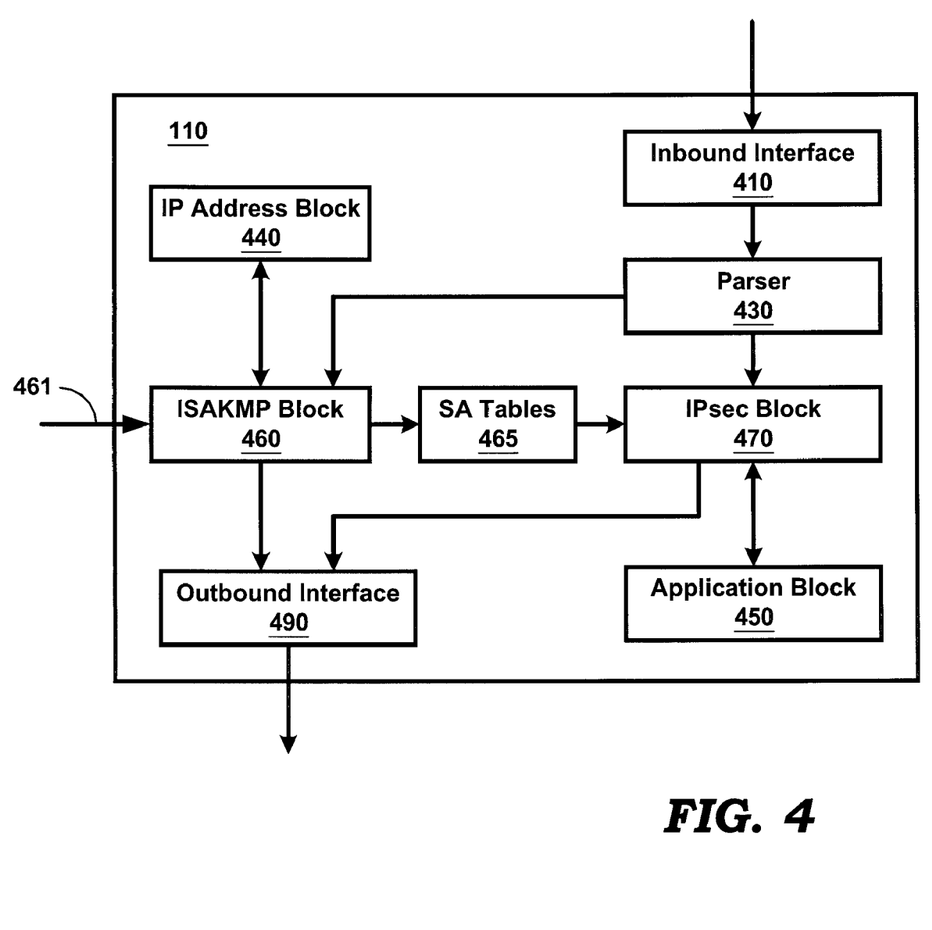
FIG. 4 is a block diagram illustrating the details of an embodiment of an end machine which allows connectivity to be continued on a secure connection even if the address ('self_address') of the end machine changes.

FIG. 4 is a block diagram illustrating the details of an embodiment of client system 110 as relevant to various aspects of the present invention. Client system 110 is shown containing inbound interface 410, parser block 430, IP address block 440, application block 450, ISAKMP block 460, SA tables 465, IPSec block 470, and outbound interface 490. Each component is described in further detail below.

Inbound interface 410 provides the electrical, physical, and protocol interfaces to receive data packets from various systems and end devices (including gateway 160). The received packets are forwarded to parser 430 in appropriate format (e.g., IP packets). Similarly, outbound interface 490 provides the electrical, physical, and protocol interfaces to send IP packets to various systems and end devices. Both inbound interface 410 and outbound interface 490 may be implemented in a known way.

Parser 430 examines each received packet and forwards the received packet to one of ISAKMP block 460 and IPSec block 470. The specific block to forward to depends generally on the header contents (e.g., protocol field, destination port number, etc.) of each received packet. Parser 430 may be implemented in a known way.

Application block 480 may generate data packets related to user applications (executed on client system 110). The data packets are forwarded to IPSec block 470 for transmission on a secure connection. Similarly, data packets, which are received on a secure connection, are received from IPsec block 470. Application block 480 provides various user applications such as file sharing, email, voice over IP, video teleconferencing, etc., and may be implemented in a known way. As may be appreciated, the data related to such applications continue to be sent even after the self_address of client system changes.

IPsec block 470 uses the information available in SA tables 465 to provide a secure connection for application block 450. Thus, depending on the specific flow (source/destination address and source/destination port combination), the attributes of the corresponding SA are used to process the packet. Such processing may entails, among other tasks, encryption (according to a SA attribute) and transmitting the encrypted packet (using another SA attribute). Similarly, the packets received on a secure connection may also be decrypted and forwarded to application block 450. IPsec block 470 may be implemented in a known way.

IP address block 440 determines a situation in which the self_address (i.e., the address on the interface 410) has changed, and interfaces with ISAKMP block 460 to cause the other end machine(s) to change the IP address binding (from old address to new address) to the security associations. IP address block 440 may pass to ISAKMP block 460 data representing the new address and the specific interface for which the address has changed.

ISAKMP block 460 sets up a secure connection by negotiating various SA attributes with an end device at the other end of the connection. The negotiation can be implemented in a known way. The SA attributes and the associated address of the end device at the other end are stored in SA tables 465 (which may store the entire data related to the security association database (SAD) noted above). In general, ISAKMP block 460 represents a block which sets up and manages a secure connection and is generally referred to as a connection management block.

In addtion, ISAKMP block 460 interfaces with the other end device to cause re_binding of a new address to an existing SA. The packet formats described above may be used during such interfacing. Thus, when an indication of a old/new address combination is received from IP address block 440, ISAKMP block 460 examines SA tables 465 to determine all the SAs (SPI list) bound to the specific old address. ISAKMP block 460 may then construct an IPADDRESS_UPDATE containing the SPI list, and send the packet using outbound interface 490.

When a packet of IPADDRESS_UPDATE_ACK type is received from parser, ISAKMP block 460 updates SA tables 465 to reflect the changed bindings. On the other hand, if an acceptance is not received (including reception of a reject response), ISAKMP block 460 may remove the SA information from SA tables 465, and negotiate the SA attributes again. The implementation of ISAKMP block 460 will be apparent to one skilled in the relevant arts by reading the disclosure provided herein.

Thus, the embodiment of FIG. 4 operates to use the same SA even after the self_address (of client system 110) changes. However, a cooperating implementation is required at the other end device also. The implementation of such an end device is described below with reference to FIG. 5.

8. Gateway

Figure 5:
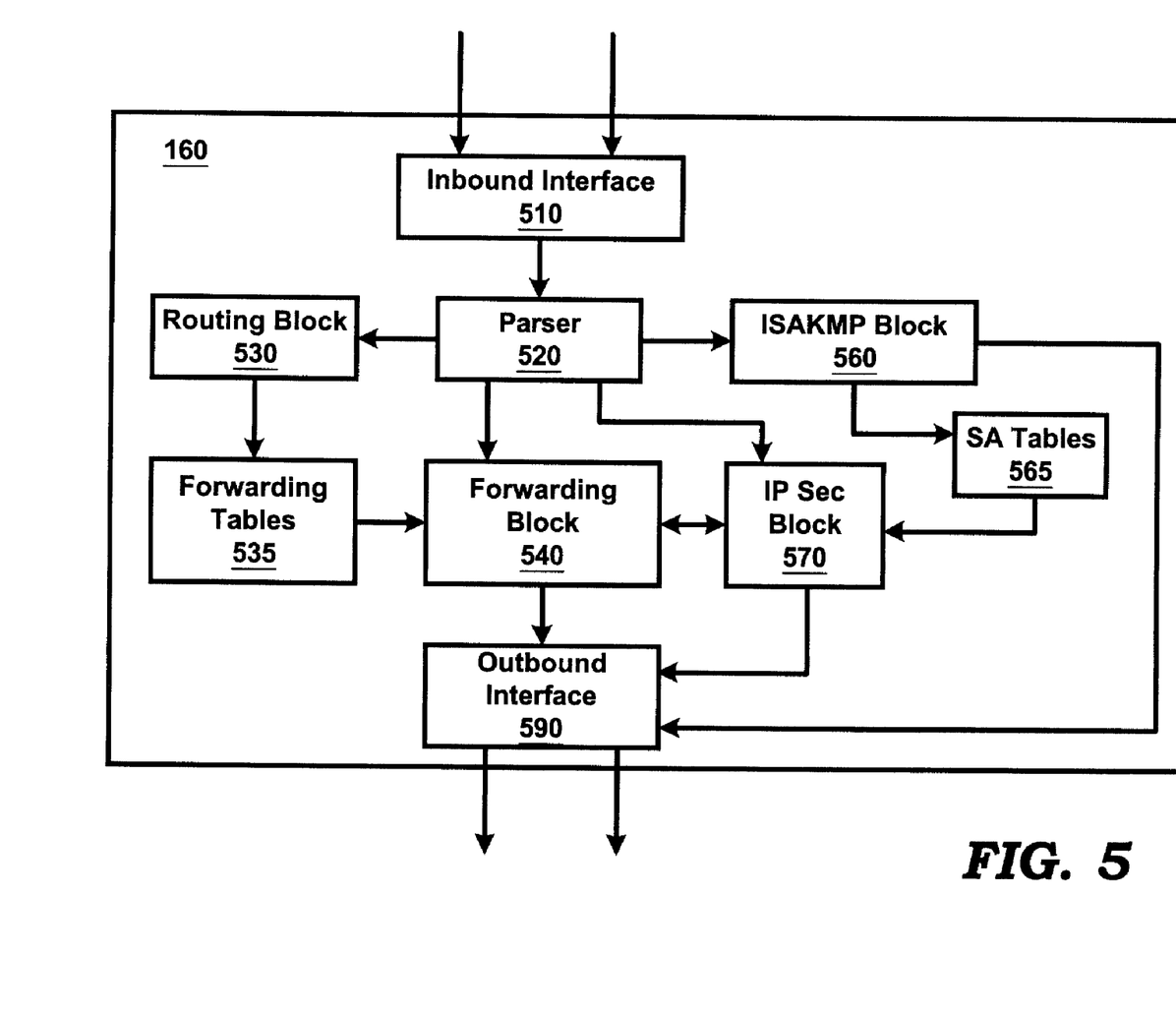
FIG. 5 is a block diagram illustrating the details of an embodiment of an end machine which enables connectivity to be continued according to an aspect of the present invention when the address of a machine at the other end of the secure connection changes.

FIG. 5 is a block diagram illustrating the details of an embodiment of gateway 160 as relevant to various aspects of the present invention. Gateway 160 is shown containing inbound interface 510, parser 520, routing block 530, forwarding block 540, ISAKMP block 560, SA tables 565, IPSec block 570, IP address block 580, and outbound interface 590. Each component is described in further detail below.

Inbound interface 510 and outbound interface 590 may be implemented similar to inbound interface 410 and outbound interface 590 respectively. Parser 520 examines each received packet and forwards the received packet to one of routing block 530, ISAKMP block 560 and IPsec block 570. The specific block to forward to depends generally on the header contents, as noted above with respect to parser 430. Parser 520 also may be implemented in a known way.

Routing block 530 receives packets related to various routing protocols (OSPF, RIP, etc.) and populates the entries in forwarding tables 535. The entries in forwarding tables 535 may be configured manually as well. In general, the entries specify the manner (next hop address and/or specific interface provided on outbound interface 590) in which each IP packet is to be forwarded/processed. Routing block 530 may be implemented in a known way.

Forwarding block 540 receives packets from parser 520 and IPsec block 570, and forwards each received packet based on the destination address contained in the packet. In general, the specific interface on outbound interface 590 (or via IPSec block 570) on which to transmit a packet, is determined based on the routing entries in forwarding tables 535. When packets (e.g, received from server system 190_A) are to be transmitted on a secure connection, each packet is forwarded to IPSec block 570.

IPsec block 470 uses the information available in SA tables 565 to provide security services for data packets received from various end systems (e.g., server systems 190_A through 190_D) connected to gateway 160. Thus, depending on the specific flow (source/destination address and source/destination port combination) on which a data packet is to be sent, the attributes of the corresponding SA are used to encrypt and transmit a packet using outbound interface 590.

Similarly, the packets received on a secure connection may also be decrypted and forwarded to various end systems (e.g., server systems 190_A through 190_D) via forwarding block 540. Packets may be transmitted within any security frame work such as IPsec, and accordingly IPsec block 470 represents an example implementation of a secure transmission block. IPsec block 570 may be implemented in a known way.

ISAKMP block 560 sets up a secure connection by negotiating various SA attributes with an end device at the other end of the connection. The negotiation can be implemented in a known way. The SA attributes and the associated address of the end device at the other end are stored in SA tables 565 (which may store the entire data related to the security association database (SAD) noted above).

ISAKMP block 560 receives an IPADDRESS_UPDATE packet (containing a new address in the ISAKMP portion of an IP payload) and determines whether change in the binding of a prior SA to the new address is possible. The entries in SA tables 565 are updated to reflect the binding of the new address to the pre_existing SA. ISAKMP block 560 then generates an IPADDRESS_UPDATE_ACK packet indicating acceptance of the request.

ISAKMP block 560 generates an IPADDRESS_UPDATE_NACK packet if the binding cannot be changed for whatever reason. The implementation of ISAKMP block 560 will be apparent to one skilled in the relevant arts by reading the disclosure provided herein.

Thus, the embodiment of FIG. 5 can be used to enable an end machine at the other end of the secure connection to use the same SAs to continue to send data (potentially without disruption) when the address (of end machine at the other end) changes.

It should be understood that the different components of client system 110 and gateway 160 can be implemented in a combination of one or more of hardware, software and firmware. In general, when throughput performance is of primary consideration, the implementation is performed more in hardware (e.g., in the form of an application specific integrated circuit).

When cost is of primary consideration, the implementation is performed more in software (e.g., using a processor executing instructions provided in software/firmware). Cost and performance can be balanced by implementing the devices with a desired mix of hardware, software and/or firmware. Embodiments implemented substantially in software is described below.

9. Software Implementation

Figure 6:
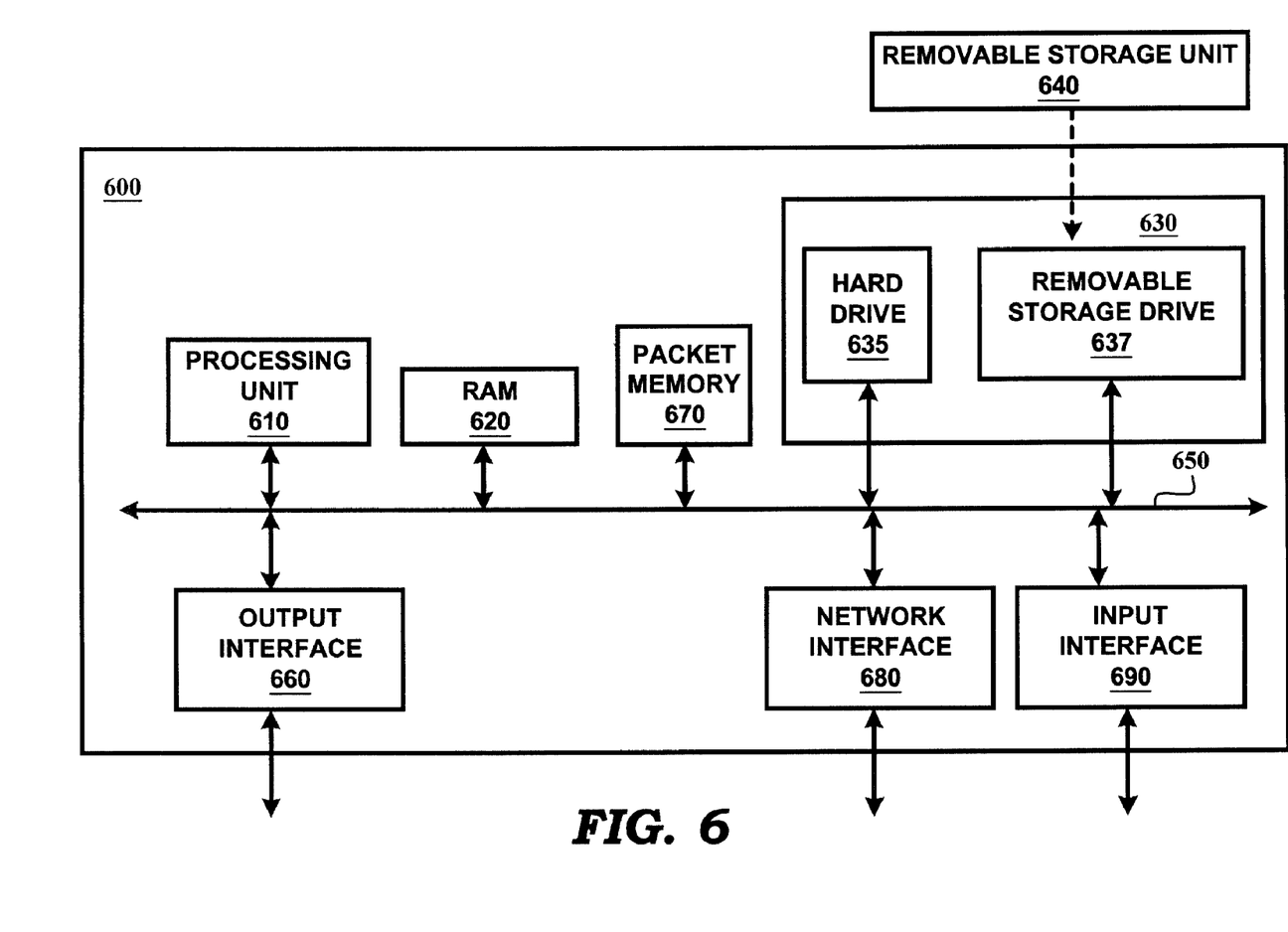
FIG. 6 is a block diagram illustrating the details of an embodiment of an end machine implemented substantially in the form of software according to an aspect of the present invention.

FIG. 6 is a block diagram illustrating the details of system 600 representing client system 110 or gateway 160 in one embodiment. System 600 is shown containing processing unit 610, random access memory (RAM) 620, secondary memory 630, output interface 660, packet memory 670, network interface 680 and input interface 690. Each component is described in further detail below.

Input interface 690 (e.g., interface with a key_board and/or mouse, not shown) enables a user/administrator to provide any necessary inputs to system 600. Output interface 660 provides output signals (e.g., display signals to a display unit, not shown), and the two interfaces together can form the basis for a suitable user interface for an user/administrator to interact with system 600.

Network interface 680 may enable System 600 to send/receive data packets to/from various other systems on corresponding paths using protocols such as Internet protocol (IP). Network interface 680, output interface 660 and input interface 690 can be implemented in a known way.

RAM 620, secondary memory 630, and packet memory 670 may together be referred to as a memory. RAM 620 receives instructions and data on path 650 (which may represent several buses) from secondary memory 630, and provides the instructions to processing unit 610 for execution. In addition, the SAD (SA database) described above may be maintained in the memory.

Packet memory 670 stores (queues) packets waiting to be forwarded (or otherwise processed) on different ports. Secondary memory 630 may contain units such as hard drive 635 and removable storage drive 637. Secondary memory 630 may store the software instructions and data, which enable System 600 to provide several features in accordance with the present invention.

Some or all of the data and instructions may be provided on removable storage unit 640 (or from a network using protocols such as Internet Protocol), and the data and instructions may be read and provided by removable storage drive 637 to processing unit 610. Floppy drive, magnetic tape drive, CD_ROM drive, DVD Drive, Flash memory, removable memory chip (PCMCIA Card, EPROM) are examples of such removable storage drive 637.

Processing unit 610 may contain one or more processors. Some of the processors can be general purpose processors which execute instructions provided from RAM 620. Some can be special purpose processors adapted for specific tasks (e.g., for memory/queue management). The special purpose processors may also be provided instructions from RAM 620.

In general, processing unit 610 reads sequences of instructions from various types of memory medium (including RAM 620, storage 630 and removable storage unit 640), and executes the instructions to provide various features of the present invention described above.

It may be appreciated that the features of above may be useful in several situations. For example, a seamless connectivity may be provided between end machines connected by a secure connection when the address of an end machine at one end of the secure connection changes (while moving from one access_net to another).

Even though the description of above is provided with reference to a situation in which the two end devices (at either of the secure connection) contain an end system and a gateway, various aspects of the present invention are intended to cover other combinations (such as two gateways, two end machines, etc.). Similarly, the approaches can be extended to multicast scenario as well.

10. Conclusion

While various embodiments of the present invention have been described above, it should be understood that they have been presented by way of example only, and not limitation. Thus, the breadth and scope of the present invention should not be limited by any of the above_described exemplary embodiments, but should be defined only in accordance with the following claims and their equivalents.

The invention claimed is:

1. A method of providing a secure connection from a first end machine to a second end machine, said method being performed in said first end machine, said method comprising:
   negotiating a first set of attributes of a security association (SA) with said second end machine, wherein said first set of attributes are used to provide said secure connection to said second end machine;
   sending to said second end machine a first packet using said SA, wherein said first end machine is assigned a self address equaling a first address such that said first packet is sent with said first address and using said SA;
   detecting that said self address is changed to a new address;
   sending a request to said second end machine, wherein said new address is contained in a payload portion of a packet forming said request, said request indicating that said self address has changed to said new address, and wherein the change from the self address to the new address triggers an Internet Security Association and Key Management Protocol (ISAKMP) element to evaluate a SA table to determine selected SAs in a security parameter Index (SPI) list that are bound to the self address, and wherein the SPI list is provided in an outgoing IP address update message to the second end machine; and
   sending to said second end machine a second packet using said SA, wherein said second packet contains said new address as a source address, wherein the first end machine is configured to send an update address request to a gateway providing connectivity to the first end machine, the update address request indicating the new address is to be bound to the SA, the first end machine being further configured to receive an acceptance message from the gateway, the acceptance message signifying that the new address is bound to the SA such that a flow is facilitated by the second machine using the SA and using the first set of attributes, wherein if the acceptance message is not received within a specified time, an assumption is made that the update address request has not been received and the first set of attributes are renegotiated for the new address for communications involving the gateway.

2. The method of claim 1, further comprising encrypting a portion of said payload containing said new address to generate an encrypted data and including said encrypted data in said request.

3. The method of claim 2, further comprising including an authentication data in said payload, wherein said authentication data authenticates that said payload is sent from said first system.

4. The method of claim 3, further comprising receiving from said second end machine a third packet in response to said second packet.

5. The method of claim 3, wherein said second packet and said third packet relate to user applications.

6. The method of claim 3, further comprising receiving a response from said second end machine, where said response indicates whether said new address is bound to said SA, wherein said second packet is sent after receiving said response.

7. The method of claim 6, wherein a plurality of secure connections are provided between said first end machine and said second end machine, wherein a plurality of SAs are present associated with corresponding ones of said plurality of secure connections, said method further comprising:
   including an identifier associated with each of said plurality of SAs in said request, wherein said response indicates whether said new address is bound to all of said plurality of SAs in said second end machine.

8. The method of claim 6, wherein said negotiating is performed according to Internet Security Association and Key Management Protocol (ISAKMP), and wherein said new address is contained in an ISAKMP portion of said payload.

9. The method of claim 8, wherein said packet comprises an IP packet.

10. The method of claim 6, wherein said first end device comprises a client system from which a user accesses a server system.

11. A method of providing a secure connection from a first end machine to a second end machine, said method being performed in said second end machine, said method comprising:
   negotiating a first set of attributes of a security association (SA) with said first end machine, wherein said first set of attributes are used to provide said secure connection to said first end machine;
   binding said SA to a first address, wherein said first address comprises a self address of said first end machine;
   receiving a request indicating that said self address of said first end machine is changed to a new address, wherein said new address is contained in a payload portion of a packet forming said request, and wherein the change from the self address to the new address triggers an Internet Security Association and Key Management Protocol (ISAKMP) element to evaluate a SA table to determine selected SAs in a security parameter Index (SPI) list that are bound to the self address, and wherein the SPI list is provided in an outgoing IP address update message; and
   binding said SA to said new address, wherein the first end machine is configured to send an update address request to a gateway providing connectivity to the first end machine, the update address request indicating the new address is to be bound to the SA, the first end machine being further configured to receive an acceptance message from the gateway, the acceptance message signifying that the new address is bound to the SA such that a flow is facilitated by the second machine using the SA and using the first set of attributes, wherein if the acceptance message is not received within a specified time, an assumption is made that the update address request has not been received and the first set of attributes are renegotiated for the new address for communications involving the gateway.

12. The method of claim 11, wherein said payload portion is received in an encrypted format, said method further comprising decrypting said payload portion to determine said new address.

13. The method of claim 12, further comprising:
receiving a first packet from said first end machine, wherein said first packet is received using said first address, wherein said first packet is received before receiving said request;
receiving a second packet from said first end machine, wherein said second packet is received using said new address, wherein said second packet is received after receiving said request; and
processing said first packet and said second packet using said SA.

14. The method of claim 13, further comprising sending a response to said first end machine upon receiving said request, where said response indicates whether said new address is bound to said SA, wherein said second packet is received after sending said response.

15. The method of claim 14, wherein a plurality of secure connections are provided between said first end machine and said second end machine, wherein a plurality of SAs are present associated with corresponding ones of said plurality of secure connections, wherein said request includes an identifier associated with each of said plurality of SAs in said request, wherein said response indicates whether said new address is bound to all of said plurality of SAs.

16. The method of claim 13, wherein said negotiating is performed according to Internet Security Association and Key Management Protocol (ISAKMP), and wherein said request is sent consistent with a format specified by ISAKMP.

17. The method of claim 13, wherein said first end device comprises a gateway.

18. A non-transitory computer readable medium carrying one or more sequences of instructions for causing a first end machine to provide a secure connection to a second end machine, wherein execution of said one or more sequences of instructions by one or more processors contained in said first end machine causes said one or more processors to perform the actions of:
negotiating a first set of attributes of a security association (SA) with said second end machine, wherein said first set of attributes are used to provide said secure connection to said second end machine;
sending to said second end machine a first packet using said SA, wherein said first end machine is assigned a self address equaling a first address such that said first packet is sent with said first address and using said SA;
detecting that said self address is changed to a new address;
sending a request to said second end machine, wherein said new address is contained in a payload portion of a packet forming said request, said request indicating that said self address has changed to said new address, and wherein the change from the self address to the new address triggers an Internet Security Association and Key Management Protocol (ISAKMP) element to evaluate a SA table to determine selected SAs in a security parameter Index (SPI) list that are bound to the self address, and wherein the SPI list is provided in an outgoing IP address update message to the second end machine; and
sending to said second end machine a second packet using said SA, wherein said second packet contains said new address as a source address, wherein the first end machine is configured to send an update address request to a gateway providing connectivity to the first end machine, the update address request indicating the new address is to be bound to the SA, the first end machine being further configured to receive an acceptance message from the gateway, the acceptance message signifying that the new address is bound to the SA such that a flow is facilitated by the second machine using the SA and using the first set of attributes, wherein if the acceptance message is not received within a specified time, an assumption is made that the update address request has not been received and the first set of attributes are renegotiated for the new address for communications involving the gateway.

19. The computer readable medium of claim 18, further comprising encrypting a portion of said payload containing said new address to generate an encrypted data and including said encrypted data in said request.

20. The computer readable medium of claim 18, further comprising including an authentication data in said packet, wherein said authentication data authenticates that said payload is sent from said first system.

21. The computer readable medium of claim 18, further comprising receiving from said second end machine a third packet in response to said second packet.

22. The computer readable medium of claim 21, wherein said second packet and said third packet relate to user applications.

23. The computer readable medium of claim 18, further comprising:
sending a request to said second end machine, wherein said request indicates that said self address has changed to said new address; and
receiving a response from said second end machine, where said response indicates whether said new address is bound to said SA, wherein said second packet is sent after receiving said response.

24. The computer readable medium of claim 23, wherein a plurality of secure connections are provided between said first end machine and said second end machine, wherein a plurality of SAs are present associated with corresponding ones of said plurality of secure connections, further comprising:
including an identifier associated with each of said plurality of SAs in said request, wherein said response indicates whether said new address is bound to all of said plurality of SAs in said second end machine.

25. The computer readable medium of claim 23, wherein said negotiating is performed according to Internet Security Association and Key Management Protocol (ISAKMP), and wherein said new address is present in an ISAKMP portion of said payload.

26. The computer readable medium of claim 23, wherein said first end device comprises a client system from which a user accesses a server system.

27. A non-transitory computer readable medium carrying one or more sequences of instructions for causing a second end machine to provide a secure connection to a first end machine, wherein execution of said one or more sequences of instructions by one or more processors contained in said second end machine causes said one or more processors to perform the actions of:
negotiating a first set of attributes of a security association (SA) with said first end machine, wherein said first set of attributes are used to provide said secure connection to said first end machine;

binding said SA to a first address, wherein said first address comprises a self address of said first end machine;

receiving a request indicating that said self address of said first end machine is changed to a new address, wherein said new address is contained in a payload portion of a packet forming said request, and wherein the change from the self address to the new address triggers an Internet Security Association and Key Management Protocol (ISAKMP) element to evaluate a SA table to determine selected SAs in a security parameter Index (SPI) list that are bound to the self address, and wherein the SPI list is provided in an outgoing IP address update message; and binding said SA to said new address, wherein the first end machine is configured to send an update address request to a gateway providing connectivity to the first end machine, the update address request indicating the new address is to be bound to the SA, the first end machine being further configured to receive an acceptance message from the gateway, the acceptance message signifying that the new address is bound to the SA such that a flow is facilitated by the second machine using the SA and using the first set of attributes, wherein if the acceptance message is not received within a specified time, an assumption is made that the update address request has not been received and the first set of attributes are renegotiated for the new address for communications involving the gateway.

28. The computer readable medium of claim 27, wherein said payload portion is received in an encrypted format, said actions further comprising decrypting said payload portion to determine said new address.

29. The computer readable medium of claim 27, further comprising:

receiving a first packet from said first end machine, wherein said first packet is received using said first address, wherein said first packet is received before receiving said request;

receiving a second packet from said first end machine, wherein said second packet is received using said new address, wherein said second packet is received after receiving said request; and processing said first packet and said second packet using said SA.

30. The computer readable medium of claim 29, further comprising:

receiving a request from said first end machine, wherein said request indicates that said self address has changed to said new address; and sending a response to said first end machine, where said response indicates whether said new address is bound to said SA, wherein said second packet is received after sending said response.

31. The computer readable medium of claim 30, wherein a plurality of secure connections are provided between said first end machine and said second end machine, wherein a plurality of SAs are present associated with corresponding ones of said plurality of secure connections, wherein said request includes an identifier associated with each of said plurality of SAs in said request, wherein said response indicates whether said new address is bound to all of said plurality of SAs.

32. The computer readable medium of claim 29, wherein said negotiating is performed according to Internet Security Association and Key Management Protocol (ISAKMP), and wherein said new address is included in an ISAKMP portion of said payload.

33. The computer readable medium of claim 29, wherein said first end device comprises a gateway.

34. A first end machine providing a secure connection to a second end machine, said first end machine comprising:

means for negotiating a first set of attributes of a security association (SA) with said second end machine, wherein said first set of attributes are used to provide said secure connection to said second end machine;

means for sending to said second end machine a first packet using said SA, wherein said first end machine is assigned a self address equaling a first address such that said first packet is sent with said first address and using said SA;

means for detecting that said self address is changed to a new address;

means for sending a request to said second end machine, wherein said new address is contained in a payload portion of a packet forming said request, said request indicating that said self address has changed to said new address, and wherein the change from the self address to the new address triggers an Internet Security Association and Key Management Protocol (ISAKMP) element to evaluate a SA table to determine selected SAs in a security parameter Index (SPI) list that are bound to the self address, and wherein the SPI list is provided in an outgoing IP address update message to the second end machine; and means for sending to said second end machine a second packet using said SA, wherein said second packet contains said new address as a source address, wherein the first end machine is configured to send an update address request to a gateway providing connectivity to the first end machine, the update address request indicating the new address is to be bound to the SA, the first end machine being further configured to receive an acceptance message from the gateway, the acceptance message signifying that the new address is bound to the SA such that a flow is facilitated by the second machine using the SA and using the first set of attributes, wherein if the acceptance message is not received within a specified time, an assumption is made that the update address request has not been received and the first set of attributes are renegotiated for the new address for communications involving the gateway.

35. The first end machine of claim 34, further comprising means for encrypting a portion of said payload containing said new address to generate an encrypted data and including said encrypted data in said request.

36. The first end machine of claim 35, further comprising means for including an authentication data in said packet, wherein said authentication data authenticates that said payload is sent from said first system.

37. The first end machine of claim 35, further comprising receiving from said second end machine a third packet in response to said second packet.

38. The first end machine of claim 37, wherein said second packet and said third packet are related to user applications.

39. The first end machine of claim 34, further comprising:

means for sending a request to said second end machine, wherein said request indicates that said self address has changed to said new address; and means for receiving a response from said second end machine, where said response indicates whether said new address is bound to said SA, wherein said second packet is sent after receiving said response.

40. The first end machine of claim 39, wherein a plurality of secure connections are provided between said first end machine and said second end machine, wherein a plurality of SAs are present associated with corresponding ones of said plurality of secure connections, said first end machine further comprising:

means for including an identifier associated with each of said plurality of SAs in said request, wherein said response indicates whether said new address is bound to all of said plurality of SAs in said second end machine.

41. The first end machine of claim 39, wherein said means for negotiating operates according to Internet Security Association and Key Management Protocol (ISAKMP), and wherein said new address is contained in an ISAKMP portion of said payload.

42. The first end machine of claim 39, wherein said first end device comprises a client system from which a user accesses a server system.

43. A second end machine providing a secure connection to a first end machine, said second end machine comprising:

means for negotiating a first set of attributes of a security association (SA) with said first end machine, wherein said first set of attributes are used to provide said secure connection to said first end machine;

means for binding said SA to a first address, wherein said first address comprises a self address of said first end machine;

means for receiving a request indicating that said self address of said first end machine is changed to a new address, wherein said new address is contained in a payload portion of a packet forming said request, and wherein the change from the self address to the new address triggers an Internet Security Association and Key Management Protocol (ISAKMP) element to evaluate a SA table to determine selected SAs in a security parameter Index (SPI) list that are bound to the self address, and wherein the SPI list is provided in an outgoing IP address update message; and means for binding said SA to said new address, wherein the first end machine is configured to send an update address request to a gateway providing connectivity to the first end machine, the update address request indicating the new address is to be bound to the SA, the first end machine being further configured to receive an acceptance message from the gateway, the acceptance message signifying that the new address is bound to the SA such that a flow is facilitated by the second machine using the SA and using the first set of attributes, wherein if the acceptance message is not received within a specified time, an assumption is made that the update address request has not been received and the first set of attributes are renegotiated for the new address for communications involving the gateway.

44. The second end machine of claim 43, wherein said payload portion is received in an encrypted format, further comprising means for decrypting said payload portion to determine said new address.

45. The second end machine of claim 44, further comprising:

means for receiving a first packet from said first end machine, wherein said first packet is received using said first address, wherein said first packet is received before receiving said request;

means for receiving a second packet from said first end machine, wherein said second packet is received using said new address, wherein said second packet is received after receiving said request; and means for processing said first packet and said second packet using said SA.

46. The second end machine of claim 45, further comprising:

means for receiving a request from said first end machine, wherein said request indicates that said self address has changed to said new address; and means for sending a response to said first end machine, where said response indicates whether said new address is bound to said SA, wherein said second packet is received after sending said response.

47. The second end machine of claim 46, wherein a plurality of secure connections are provided between said first end machine and said second end machine, wherein a plurality of SAs are present associated with corresponding ones of said plurality of secure connections, wherein said request includes an identifier associated with each of said plurality of SAs in said request, wherein said response indicates whether said new address is bound to all of said plurality of SAs.

48. The second end machine of claim 45, wherein said negotiating is performed according to Internet Security Association and Key Management Protocol (ISAKMP), and wherein said new address is contained in an ISAKMP portion of said payload.

49. The second end machine of claim 45, wherein said first end device comprises a gateway.

50. A networking system comprising:

a first end device and a second end device operable to:

set up a secure connection between said first end device and said second end device, wherein said SA is bound to a first address in said second end device, wherein said first address comprises a self address of said first end device, wherein said secure connection is based on a security association (SA);

change said self address of said first end device to a new address;

send a request to said second end machine, wherein said new address is contained in a payload portion of a packet forming said request, said request indicating that said self address has changed to said new address, and wherein the change from the self address to the new address triggers an Internet Security Association and Key Management Protocol (ISAKMP) element to evaluate a SA table to determine selected SAs in a security parameter Index (SPI) list that are bound to the self address, and wherein the SPI list is provided in an outgoing IP address update message to the second end device; and continue using said SA to provide said secure connection between said first end device and said second end device, wherein the first end machine is configured to send an update address request to a gateway providing connectivity to the first end machine, the update address request indicating the new address is to be bound to the SA, the first end machine being further configured to receive an acceptance message from the gateway, the acceptance message signifying that the new address is bound to the SA such that a flow is facilitated by the second machine using the SA and using the first set of attributes, wherein if the acceptance message is not received within a specified time, an assumption is made that the update address request has not been received and the first set of attributes are renegotiated for the new address for communications involving the gateway.

51. The networking system of claim 50, wherein said first end system is further operable to encrypt a portion of said payload containing said new address to generate an encrypted data and include said encrypted data in said request.

52. The networking system of claim 51, wherein said first end system is further operable to include an authentication data in said payload, wherein said authentication data authenticates that said payload is sent from said first system.

53. The networking system of claim 52, wherein said secure connection is established according to Internet Security Association and Key Management Protocol (ISAKMP), and wherein said new address is contained in an ISAKMP portion of said payload.

54. The networking system of claim 53, wherein said first end device comprises an address block detecting that said self address has changed from said first address to said new address, said address block sending a request to said second end device indicating that said new address is to be bound to said SA.

55. The networking system of claim 54, wherein said second end device comprises:
a memory storing a security association database (SAD) representing binding of SAs to corresponding self addresses at the other end of security connections, wherein said SAD is modified to indicate that said new address is associated with said SA in response to receiving said request.

56. The networking system of claim 55, wherein said second end device further comprises:
a connection management block negotiating a plurality of attributes with said first end device, wherein said plurality of attributes form said SA, said connection management block receiving said request and modifying said SAD to bind said SA to said new address.

57. The networking system of claim 56, wherein said second end device comprises a gateway.

58. A first end machine providing a secure connection to a second end machine, said first end machine comprising:
a connection management block negotiating a first set of attributes of a security association (SA) with said second end machine, wherein said first set of attributes are used to provide said secure connection to said second end machine;
an address block detecting that a self address of said first end machine is changed from a first address to a new address and sending a request to said second end machine, wherein said new address is contained in a payload of a packet forming said request, said request indicating that said self address has changed to said new address, and wherein the change from the self address to the new address triggers an Internet Security Association and Key Management Protocol (ISAKMP) element to evaluate a SA table to determine selected SAs in a security parameter Index (SPI) list that are bound to the self address, and wherein the SPI list is provided in an outgoing IP address update message to the second end machine; and
a secure transmission block sending to said second end machine a first packet using said SA, wherein said first end machine is assigned a self address equaling a first address such that said first packet is sent with said first address and using said SA, said secure transmission block sending a second packet using said SA and said new address after said address block detects that said self address is changed to said new address, wherein the first end machine is configured to send an update address request to a gateway providing connectivity to the first end machine, the update address request indicating the new address is to be bound to the SA, the first end machine being further configured to receive an acceptance message from the gateway, the acceptance message signifying that the new address is bound to the SA such that a flow is facilitated by the second machine using the SA and using the first set of attributes, wherein if the acceptance message is not received within a specified time, an assumption is made that the update address request has not been received and new SA the first set of attributes are renegotiated for the new address for communications involving the gateway.

59. The first end machine of claim 58, wherein said address block encrypts a portion of said payload containing said new address to generate an encrypted data and includes said encrypted data in said request.

60. The first end machine of claim 59, wherein said address block includes an authentication data in said payload, wherein said authentication data authenticates that said payload is sent from said first system.

61. The first end machine of claim 60, wherein said secure connection is established according to Internet Security Association and Key Management Protocol (ISAKMP), and wherein said new address is contained in an ISAKMP portion of said payload.

62. The first end machine of claim 61, wherein said secure connection is provided using said SA both before and after said the change of said self address such that said secure communication can be provided with minimal overhead even if said self address changes.

63. The first end machine of claim 62, wherein said secure transmission block receives from said second end machine a third packet in response to said second packet.

64. The first end machine of claim 61, wherein said connection management block sends a request to said second end machine, wherein said request indicates that said self address has changed to said new address, said connection management block receiving a response from said second end machine, where said response indicates whether said new address is bound to said SA in said second machine, wherein said second packet is sent after receiving said response.

65. The first end machine of claim 64, wherein a plurality of secure connections are provided between said first end machine and said second end machine, wherein a plurality of SAs are present associated with corresponding ones of said plurality of secure connections, wherein said address block includes an identifier associated with each of said plurality of SAs in said request, wherein said response indicates whether said new address is bound to all of said plurality of SAs in said second end machine.

66. The first end machine of claim 64, wherein said connection management block operates according to Internet Security Association and Key Management Protocol (ISAKMP), and wherein said request is sent consistent with a format specified by ISAKMP.

67. The first end machine of claim 66, wherein at least some of said first set of attributes are contained in an ISAKMP SA.

68. A second end machine providing a secure connection to a first end machine, said second end machine comprising:
a connection management block negotiating a first set of attributes of a security association (SA) with said first end machine, wherein said first set of attributes are used to provide said secure connection to said first end machine; and
a memory storing a security association database (SAD) indicating that said SA is bound to a first address, wherein said first address comprises a self address of said first end machine,
wherein said connection management block receives a request indicating that said self address of said first end machine is changed to a new address and changes said SAD to indicate that said SA is bound to said new address, and wherein the change from the self address to the new address triggers an Internet Security Association and Key Management Protocol (ISAKMP) element to evaluate a SA table to determine selected SAs in a security parameter Index (SPI) list that are bound to the self address, and wherein the SPI list is provided in an outgoing IP address update message, wherein said new address is contained in a payload portion of a packet forming said request, wherein the first end machine is configured to send an update address request to a gateway providing connectivity to the first end machine, the update address request indicating the new address is to be bound to the SA, the first end machine being further configured to receive an acceptance message from the gateway, the acceptance message signifying that the new address is bound to the SA such that a flow is facilitated by the second machine using the SA and using the first set of attributes, wherein if the acceptance message is not received within a specified time, an assumption is made that the update address request has not been received and the first set of attributes are renegotiated for the new address for communications involving the gateway.

69. The second end machine of claim 68, wherein said payload portion is received in an encrypted format, said connection management block decrypting said payload portion to determine said new address.

70. The second end machine of claim 68, further comprising a secure transmission block receiving a first packet from said first end machine, wherein said first packet is received using said first address, wherein said first packet is received before receiving said request, said secure transmission block receiving a second packet from said first end machine, wherein said second packet is received using said new address, wherein said second packet is received after receiving said request, wherein said secure transmission block processes said first packet and said second packet using said SA.

71. The second end machine of claim 70, wherein said connection management block receives a request from said first end machine, wherein said request indicates that said self address has changed to said new address, said connection management block sending a response to said first end machine after changing said SAD, wherein said response indicates whether said new address is bound to said SA, wherein said second packet is received after sending said response.

72. The second end machine of claim 71, wherein a plurality of secure connections are provided between said first end machine and said second end machine, wherein a plurality of SAs are present associated with corresponding ones of said plurality of secure connections, wherein said request includes an identifier associated with each of said plurality of SAs in said request, wherein said response indicates whether said new address is bound to all of said plurality of SAs.

73. The second end machine of claim 70, wherein said negotiating is performed according to Internet Security Association and Key Management Protocol (ISAKMP), and wherein said request is sent consistent with a format specified by ISAKMP.

74. The second end machine of claim 73, wherein at least some of said first set of attributes are contained in an ISAKMP SA.

75. The second end machine of claim 70, wherein said first end device comprises a gateway.

* * * * *